E. P. LARSH.
LUBRICATING MEANS FOR PUMPS AND ENGINES.
APPLICATION FILED NOV. 1, 1916.
1,259,249. Patented Mar. 12, 1918.
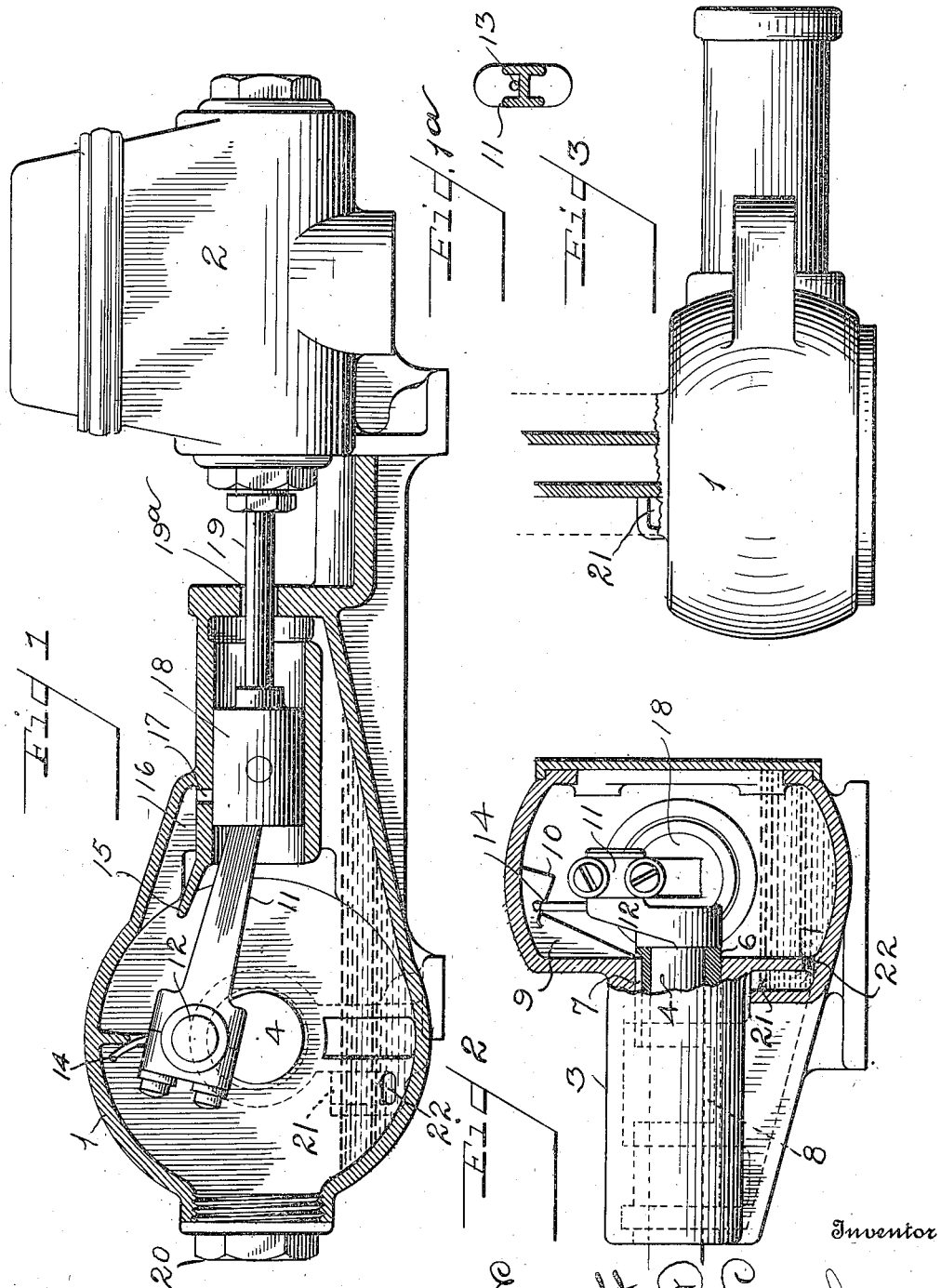

UNITED STATES PATENT OFFICE.

EVERETT P. LARSH, OF DAYTON, OHIO, ASSIGNOR TO THE BURNETT-LARSH MANUFAC-
TURING COMPANY, OF DAYTON, OHIO, A CORPORATION OF OHIO.

LUBRICATING MEANS FOR PUMPS AND ENGINES.

1,259,249.  Specification of Letters Patent.  Patented Mar. 12, 1918.

Application filed November 1, 1916.  Serial No. 128,847.

*To all whom it may concern:*

Be it known that I, EVERETT P. LARSH, citizen of the United States, residing at Dayton, in the county of Montgomery and State of Ohio, have invented certain new and useful Improvements in Lubricating Means for Pumps and Engines, of which the following is a specification.

My invention relates to the lubrication of moving parts involving a reservoir for lubricant, and is particularly applicable to the crank cases of pump engines or motors, or other mechanisms involving analogous constructions. While the invention has been illustrated in the drawings and herein described in conjunction with the crank cases of a hydraulic pump it is to be understood that it is not to be limited to such construction or location but may be employed in any construction involving a lubricating reservoir and is particularly desirable upon hydraulic machinery.

The object of the invention is to simplify and improve the means and mode of distributing the lubricant and particularly to prevent the displacement of the lubricant by the accumulation of water within the reservoir.

With the above primary and other incidental objects in view, as will more fully appear in the specification, the invention consists of the features of construction, the parts and combinations thereof, and the mode of operation or their equivalents as hereinafter described and set forth in the claims.

Referring to the drawings, Figure 1 is a side elevation partly in section of a hydraulic pump to which the invention forming the subject matter hereof has been applied. Fig. 1ª is a detail sectional view of the pitman. Fig. 2 is a transverse sectional view through the crank casing of the motor. Fig. 3 is a top plan view thereof.

Like parts are indicated by similar characters of reference throughout the several views.

It is quite the common practice in pump and engine construction to employ the lower portion of the crank casing as an oil reservoir from which the crank bearings are supplied at each rotation of the crank. In hydraulic pumps and steam engines much difficulty has been experienced heretofore through the accumulation of water within the crank case which displaces the lubricant contents thereof. In hydraulic pumps the seepage water which may leak through the packing gland of the pump cylinder follows the piston rod and finally drips therefrom into the crank case or housing. The water of condensation in the case of the steam engines follows a like course. It has been customary to provide a wiping gland at the point of entrance of the piston rod into the cross head and crank casing or housing. However to be efficient said wiping gland must be tightly adjusted upon the piston rod. When adjusted sufficiently tight to prevent the creeping of moisture into the housing or casing it affords increased friction to such extent as to decrease the efficiency of the pump or motor. Without the protection of a wiping gland or other means for collecting or excluding the moisture from the cross head and crank housing the accumulation of water in the crank casing gradually raises the level of the lubricant until the oil oozes out of the crank casing through the shaft housing and is lost while only water remains in the casing.

Under such condition the engineer knowing that the casing contains a full charge of liquid may be misled into believing that such liquid is oil of proper consistency and will neglect to supply proper lubricant. To avoid such contingency and prevent the displacement of the oil by an accumulation of water by providing a means of escape of the water accumulation independent of the oil is one of the primary objects of the present invention.

Referring to the drawings there is shown a hydraulic pump in which the invention forming the subject matter hereof has been embodied. This pump comprises a crank and cross head housing or casing 1 in which are inclosed the operating parts to be lubricated while at the opposite end of the main frame is located the pump body 2 inclosing a cylinder and valve mechanism. Mounted in suitable bearings, extending laterally from the crank casing 1, is a crank shaft, 4, which may carry at its outer end a balance or fly wheel or a driving pulley in the event that the pump is driven by electric or other motor. Within the bearing sleeve 3 and surrounding the shaft 4 is provided a bushing 6 having in its upper side a groove 7 leading to a pocket or chamber 8, forming a supplemental reservoir for oil or other lubricant.

Projecting from the interior side and top of the crank casing 1, is a web or vane 9 inclined downwardly and laterally to a point immediately above the open end of the channel or conduit 7. This web or vane 9 is also extended downward in a pendant point 10 immediately above the crank shaft and in the plane of operation of the pitman 11 which is connected to the crank 12 of the crank shaft 4. The pitman 11 is channeled or formed substantially H shaped in cross section as shown in detail in Fig. 1ª. From the uppermost channel of this H shaped pitman an oil conduit 13 leads to the crank bearing within the head of the pitman. Carried by the crank 12 and projecting radially therefrom is a flexible finger of leather fabric or other suitable material which as the crank rotates is submerged in oil or lubricant in the bottom of the crank casing 1 where it collects a charge of oil which as the flexible finger is raised to its highest point is wiped from the finger 14 to ribs or vanes 9 and 10. The flexible finger 14 is of sufficient length to be flexed and drawn across the rib or vane 9 at each rotation of the crank shaft thereby depositing a fresh charge of oil or lubricant at each contact. The oil or lubricant deposited upon the vanes or ribs 9 and 10 by the wiping action of the finger 14 at each rotation flows down the inclined rib 9 to the conduit or channel 7 and thence through the said channel to the chamber 8 to lubricate the crank shaft 4. A portion of the oil or lubricant also flows down the inclined web or vane 10 and drips from the point thereof into the channel or groove of the pitman 11 from which it passes through the oil duct 13 to the crank. Any excess of oil or lubricant carried by the flexible finger 14 is received upon the transverse vane or rib 15 immediately above the pitman from which it flows through the recess 16 of the housing or casing 1 and thence through the oil duct 17 to lubricate the sliding head 18 with which the pitman is connected. A sliding head 18 actuated by the pitman is connected by the usual piston rod 19 with the pump piston or in the case of a motor or engine with the piston of the expansion cylinder. It will be understood that the cross head 18 and piston rod 19 are reciprocated to and fro at each rotation of the crank 12. The usual wiping gland is omitted at the point 19ª and moisture may freely enter the housing upon the piston rod and drain down the inclined bottom of the housing to the crank compartments. Lubricant is ordinarily introduced into the casing 1 through an opening normally closed by the head or plug 20. In practice an engineer sometimes neglects to examine the condition of the lubricant within the casing or to supply additional oil required on account of the difficulty or inconvenience of removing the head or plug 20. The construction hereinafter described is further designed to enable the operator to ascertain at any time the fluid level of the contents of the reservoir. It is further designed to prevent the raising of the fluid level either by the introduction of an excess quantity of the lubricant or by the accumulation of water to such point as to flood the crank shaft bearings.

To this end there is provided at one side of the crank case a well or overflow conduit 21, opened on its upper end and communicating with the interior of the casing 1 through an orifice 22 adjacent to the bottom of the crank casing or lubricant reservoir. As the water accumulates in the crank casing the lubricant being of less specific gravity will float on top of the water which descends to the bottom of the casing, the fluid will of course stand at the same level in the well or conduit 21 that it does in the casing, the top of the well or conduit 21 determines the maximum height of the contents of the casing. This maximum height is of course at a lower level than the crank shaft bearings so that the lubricant cannot possibly rise to a point where it will ooze through the bearings and be lost. As the water continues to accumulate within the casing the oil or lubricant will be floated above the level of the orifice 22 and when the maximum level determined by the height of the well or conduit 21 is reached, the excess fluid will be discharged through the outlet conduit. Inasmuch as this conduit communicates with the reservoir adjacent to its bottom, only water will be drawn from the reservoir or casing and the oil will remain therein. It is only in the event that an excess quantity of oil or lubricant is placed within the reservoir or casing that oil will be discharged from the vent or outlet conduit 21.

The vent or outlet conduit serves the additional purpose of enabling the operator or engineer to determine the fluid level of the contents of the reservoir or casing by observing the height of the fluid within the outlet conduit 22. It will be understood that any water or moisture gaining admission to the casing or reservoir tends to raise the fluid level thereof while the added moisture or water descends to the bottom of the reservoir. Inasmuch as the vent or outlet conduit 21 drains the reservoir from a point adjacent to the bottom of the reservoir and beneath the strata of oil or lubricant only water or moisture will be discharged from the reservoir. When the fluid level has been lowered to such point that oil or lubricant may find its way through the orifice 22 into the vent or outlet conduit 21 the fluid level of the contents of the reservoir will be below the top of the vent or outlet conduit 21 and the discharge of the contents arrested.

This conduit 21 also provides a convenient way of introducing additional lubricant into the reservoir or casing. On account of the inconvenience of removing the head or plug 20, the replenishing of the lubricant supply is frequently neglected. Open oil holes for the introduction of lubricant are objectionable on account of the possible entrance of dust or other foreign matter. The vent conduit 21 is not open to these objections inasmuch as any dirt or dust collected will float upon the top of the contents of the conduit and will be discharged at the first overflow. At the same time oil or lubricant introduced in the vent or outlet conduit 21, so long as the fluid level is lower than the top of the conduit, will flow therefrom through the orifice 22 into the interior of the casing or reservoir until the fluid level of the contents of the reservoir is raised to the level of the vent or outlet conduit 21 before it will overflow said conduit.

The construction thus described affords a convenient, simple and economical method of overcoming several serious difficulties heretofore experienced and while seemingly very simple it has been found in practice to be quite efficient for the purpose for which it is designed.

The present application so far as it pertains to the lubricant distribution by means of the flexible finger 14 and the gravity feed of lubricant to the several bearings is a division of copending application, Serial No. 78081, filed February 12, 1916, in which the same subject matter was originally disclosed and claimed.

From the above description it will be apparent that there is thus provided a device of the character described, possessing the particular features of advantage before enumerated as desirable but which obviously is susceptible of modification in its form, proportion detail construction or arrangement of parts, without departing from the principle involved or sacrificing any of its advantages.

While in order to comply with the statute the invention has been described in language more or less specific as to certain structural features, it is to be understood that the invention is not limited to any specific details, but that the means and construction herein described comprises but one mode of putting the invention into effect, and the invention is therefore claimed broadly in any of its possible forms or modifications within the scope of the appended claims.

Having thus described my invention I claim—

1. In a construction of the character described, a crank, a pitman connected therewith, the upper side of which is channeled, a crank casing also forming a reservoir for lubricant, a pendent web or vane projecting from the top of the casing terminating in a vertical plane common with the pitman, a flexible finger carried by the crank adapted to wipe said web or vane from which lubricant deposited by said finger will drip into the channel of the pitman and a duct leading from the channel to the pitman bearing.

2. In a construction of the character described a crank, a pitman connected therewith, a bearing for the crank shaft and a duct leading to said bearing, a crank casing forming a reservoir for lubricant, an integral pendant rib or vane projecting from the top of said casing and terminating in a vertical plane common with the said duct, a flexible finger carried by the crank adapted to wipe said web or vane from which lubricant deposited thereon by said finger will pass into said duct and thence to said bearing.

3. In a construction of the character described, a main frame, a crank, a pitman connected therewith, a reciprocatory cross head to which the opposite end of the pitman is connected, a flexible finger carried by the crank, an oil reservoir located in the main frame, a flange integral with the main frame projecting into the path of the finger and a passageway extending from the flange to the cross head bearing whereby lubricant deposited upon the flange by the wiping engagement of the finger will be conducted to said crosshead bearing.

4. The combination with a mechanism embodying a horizontal reciprocatory piston rod, of means for disposing of drainage from the piston rod, comprising a collecting channel beneath said rod for drainings of water and oil, a reservoir to which said channel leads, and a wall dividing said reservoir into two intercommunicating compartments having a communicating opening adjacent to the bottom of the reservoir, substantially as and for the purpose specified.

5. The combination with a mechanism including a horizontal reciprocatory cross head, a cross head bearing, a reservoir, of means for disposing of drippings from the piston rod, comprising a drain channel for water and oil leading from the cross head bearing to the reservoir, and an overflow conduit leading from a point adjacent to the bottom of the reservoir and discharging at the maximum fluid level thereof formed integral with the crank casing by extending a lateral integral wall to a point adjacent to the bottom of the casing, thereby dividing the casing into two intercommunicating compartments, substantially as specified.

6. The combination with a horizontal frame including a crank case and cross head bearing, of means for disposing of moisture deposited from the piston rod, comprising an inclined passage leading from a point adjacent to the cross head bearing to the crank casing adapted to receive drainage from the piston rod, and an outlet passage for the moisture leading from a point adjacent to the bottom of the crank casing and discharging at a point elevated thereabove.

7. The combination with a crank casing and a crank mounted therein, of a pitman connected with the crank, the upper side of which is channeled, a pendant web or vane formed integral with the casing terminating in a vertical plane common with the pitman, a flexible finger carried by the crank adapted to wipe said web or vane from which lubricant deposited by said finger will drip into the channel of the pitman, and a duct leading from the channel to the pitman bearing.

8. The combination with a main frame having a lubricant reservoir therein, and a revoluble member mounted in proximity to the reservoir, of a bearing for the revoluble member having a lubricant chamber therein, and a conduit leading to said chamber, a web or vane formed integral with said main frame and terminating in a vertical plane common with the said bearing conduit, a flexible finger carried by the revoluble member adapted to wipe said web or vane from which lubricant deposited by said finger will pass through said conduit to said chamber.

9. The combination of a main frame having a lubricant reservoir therein, a crank mounted in the main frame, a pitman connected therewith, a reciprocatory cross head to which the opposite end of the pitman is connected, a bearing for the cross head upon the main frame, of a flexible finger carried by the crank, a flange formed integral with the main frame projecting into the path of the finger, a passageway extending from the flange to the crosshead bearing whereby lubricant deposited upon the flange by the wiping engagement of the finger will be conducted to said crosshead bearing.

10. A main frame providing a support and reservoir housing for crank transmission devices, including a circular casing portion having a horizontally disposed radial extension portion forming a cross head housing, and having a downwardly inclined drain surface portion spaced from the cross head housing and leading toward the circular casing portion, and an overflow conduit leading upward from a point adjacent to the bottom of the circular casing portion.

11. A main frame including a crank case affording therein a lubricant reservoir, a journal bearing projecting laterally therefrom, a radially disposed horizontal extension projecting from the crank case containing a cross head bearing, inclined drainage surfaces provided beneath the journal and crosshead bearings leading to the lubricant reservoir in said crank case, means for distributing oil from said reservoir to the journal and crosshead bearings, and an overflow conduit communicating with the reservoir adjacent to the bottom thereof and terminating below the level of the journal bearing.

12. In a device of the class described, a closed crank casing having a journal bearing, an interior integral rib projecting from the top of the casing and axially alined with the journal bearing, a crank shaft journaled in the bearing, and a flexible finger carried by the crank and adapted upon rotation of the crank to strike said integral rib for conveying lubricant from the crank case to the rib from which the lubricant is deposited in the crank bearings.

13. In a device of the class described, a closed crank casing having a journal bearing, an integral rib provided in the top of said casing, a crank shaft journaled in said bearing, and a contact member carried by the crank shaft adapted to dip lubricant from the base of the casing during the rotation of the shaft and deposit same upon the rib, said rib being formed and adapted for feeding the lubricant by gravity to the crank shaft bearings.

14. In a device of the class described, a main frame, a crank shaft journaled therein, a yielding finger carried by the crank shaft, lubricant draining surfaces integral with the main frame projecting into the path of the yielding finger, said finger being adapted to carry lubricant from the base of the main frame and deposit same upon the integral lubricant draining surfaces for distribution by gravity to various points in the main frame.

In testimony whereof, I have hereunto set my hand this 28th day of October, A. D. 1916.

EVERETT P. LARSH.

Witnesses:
   Edw. E. Duncan,
   Frank L. Walker.